(12) United States Patent
Veit

(10) Patent No.: US 12,467,872 B2
(45) Date of Patent: Nov. 11, 2025

(54) METHOD AND DEVICE FOR DETECTING LOCAL DEFECTS ON A REFLECTIVE SURFACE

(71) Applicant: ISRA VISION GMBH, Darmstadt (DE)

(72) Inventor: Klaus Veit, Fürth (DE)

(73) Assignee: ISRA VISION GmbH, Darmstadt (DE)

( * ) Notice: Subject to any disclaimer, the term of this patent is extended or adjusted under 35 U.S.C. 154(b) by 43 days.

(21) Appl. No.: 18/577,922

(22) PCT Filed: Sep. 9, 2022

(86) PCT No.: PCT/EP2022/075123
§ 371 (c)(1),
(2) Date: Jan. 9, 2024

(87) PCT Pub. No.: WO2023/041436
PCT Pub. Date: Mar. 23, 2023

(65) Prior Publication Data

US 2024/0319105 A1   Sep. 26, 2024

(30) Foreign Application Priority Data

Sep. 15, 2021  (DE) .......................... 102021123880.3

(51) Int. Cl.
*G01N 21/88* (2006.01)
*G01N 21/958* (2006.01)

(52) U.S. Cl.
CPC ....... *G01N 21/8806* (2013.01); *G01N 21/958* (2013.01); *G01N 2021/8829* (2013.01);
(Continued)

(58) Field of Classification Search
CPC ............ G01N 21/8806; G01N 21/958; G01N 2021/8829; G01N 2021/9586; G01N 2201/126; G01B 11/2513
(Continued)

(56) References Cited

U.S. PATENT DOCUMENTS

| | | | |
|---|---|---|---|
| 7,532,333 B2 | 5/2009 | Haeusler et al. | |
| 8,064,069 B2 | 11/2011 | Wienand et al. | |

(Continued)

FOREIGN PATENT DOCUMENTS

| | | |
|---|---|---|
| DE | 102004020419 B3 | 10/2005 |
| DE | 102013216566 A1 | 2/2015 |

(Continued)

OTHER PUBLICATIONS

International Search Report and Written Opinion for corresponding International Patent Application No. PCT/EP2022/075123 dated Jan. 12, 2023.

(Continued)

*Primary Examiner* — Md M Rahman
(74) *Attorney, Agent, or Firm* — Greer, Burns & Crain, Ltd.

(57) ABSTRACT

A method for detecting local defects on a reflective surface with a device having at least one pattern for reflection on the reflective surface, at least one camera and a data processing unit. The pattern has at least one substantially linear light-dark transition, the positioning and orientation of the camera are known, the camera captures the pattern reflected on the surface and generates image data of the reflected pattern which are transmitted by the camera to the data processing unit, and the data processing unit determines local defects on the surface on the basis of an evaluation of at least one (Continued)

property of the at least one light-dark transition in the image data of the reflected pattern. Also a device and a computer program.

11 Claims, 1 Drawing Sheet

(52) U.S. Cl.
CPC .............. *G01N 2021/9586* (2013.01); *G01N 2201/126* (2013.01)

(58) Field of Classification Search
USPC ...................................... 356/237.2
See application file for complete search history.

(56) References Cited

U.S. PATENT DOCUMENTS

| | | |
|---|---|---|
| 9,891,168 B2 | 2/2018 | Kostka et al. |
| 2013/0098127 A1* | 4/2013 | Isei .................... B21B 1/22 72/17.3 |
| 2019/0287237 A1 | 9/2019 | Bonfim et al. |
| 2020/0005704 A1* | 1/2020 | Tong .................... G06F 3/147 |
| 2021/0266434 A1* | 8/2021 | Makino .................. G06T 7/50 |
| 2021/0325313 A1 | 10/2021 | Kasavala et al. |

FOREIGN PATENT DOCUMENTS

| | | | |
|---|---|---|---|
| DE | 102014104338 A1 * | 10/2015 | .......... G01N 21/896 |
| DE | 102018118602 B3 | 11/2019 | |
| WO | 2007115621 A2 | 10/2007 | |

OTHER PUBLICATIONS

Z. Zhang, "A Flexible New Technique for Camera Calibration", Technical Report, Microsoft Research Microsoft Corporation, One Microsoft Way, Redmond, WA (USA); 22 pages.

C. Fraser, "Digital Camera Self-Calibration" ISPRS Journal of Photogrammetry and Remote Sensing, No. 52(4), 1997, pp. 149-159.

International Preliminary Report on Patentability and Written Opinion for corresponding International Patent Application No. PCT/EP2022/075123 dated Mar. 5, 2024.

* cited by examiner

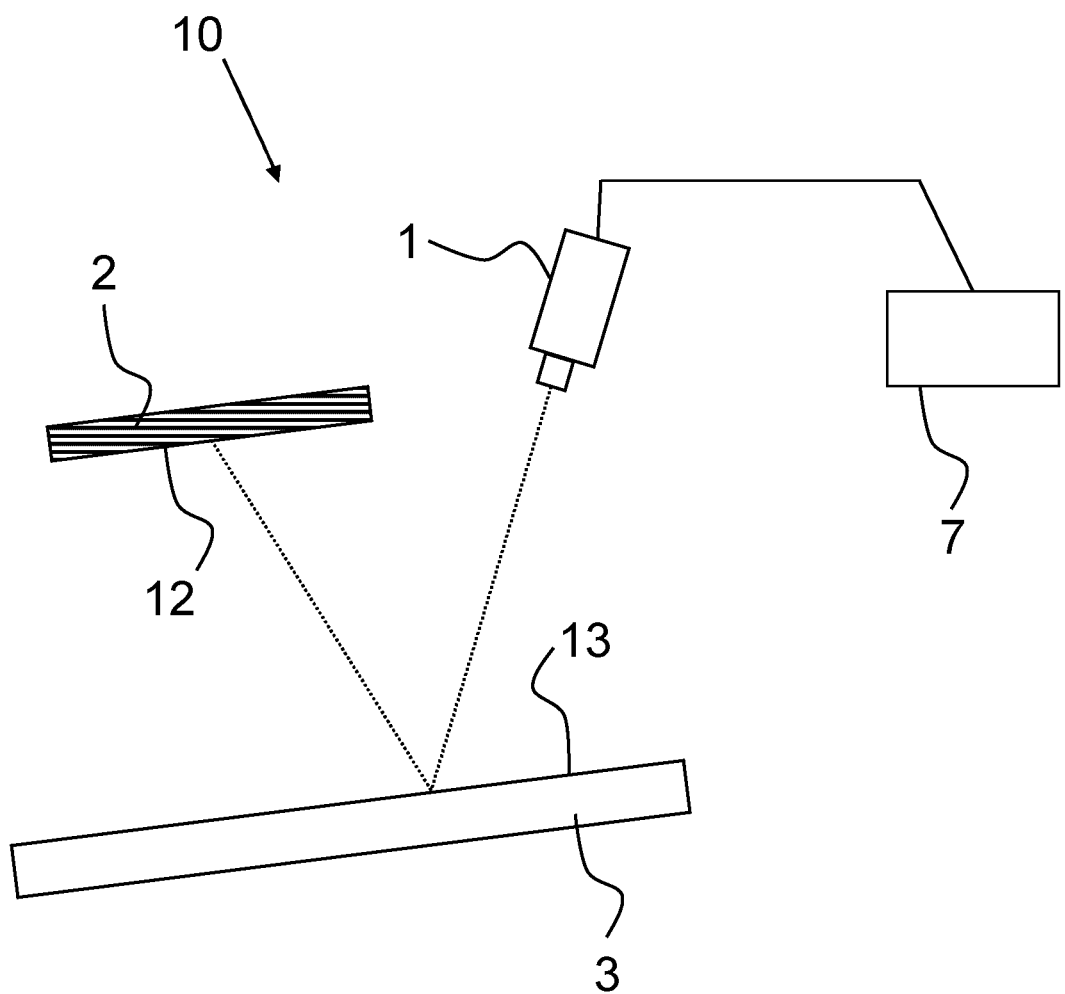

METHOD AND DEVICE FOR DETECTING LOCAL DEFECTS ON A REFLECTIVE SURFACE

CROSS-REFERENCES TO RELATED APPLICATIONS

This application is a national phase of International Patent Application No. PCT/EP2022/075123, filed on Sep. 9, 2022, which claims the benefit of German Patent Application No. 10 2021 123 880.3, filed on Sep. 15, 2021, the entire disclosures of which are incorporated herein by way of reference.

FIELD OF THE INVENTION

The invention relates to a method and a device for detecting local defects on a reflective surface, wherein the device comprises at least one pattern for reflection on the reflective surface, at least one camera and a data processing unit. The invention also relates to a computer program product and a computer-readable data carrier.

BACKGROUND OF THE INVENTION

Methods in which a pattern of known shape and position is reflected by a reflective surface and the reflected image is viewed and evaluated with a camera are known for measuring the shape of reflective surfaces. The term deflectometry is also used for such methods.

Such deflectometry methods already exist in a large number of variants. In the known methods, a camera is used to look into the reflected image of a pattern reflected on the surface. This pattern is encoded in some way, either in a planar or temporal sequence of different patterns, which are recorded one after the other to produce one or more corresponding images. These patterns may be recognized in the one or more images. Thus, when using a digital camera, each camera pixel can be assigned to a point on the pattern or patterns that this pixel is looking at. The system knows where the camera and the pattern(s) are located in the room thanks to an advance calibration. This information may then be used to determine various geometric properties of the surface such as inclination, curvature and, depending on the structure of the known system, also the shape of the surface. These properties of the surface may then be used to determine whether the surface comprises defects. An example of such a method is shown in the document WO 2007/115621 A2.

However, these methods are comparatively complex. Extensive algorithms must be calculated to decode the patterns and reconstruct the surface measured in this way. This significantly reduces the evaluation speed. In addition, many of these methods require several images in order to be able to resolve the coding, or large, clearly area-coded patterns are required, which are relatively complex to produce. Calibrating these systems is also time-consuming and in many cases requires large plane mirrors. This involves considerable effort, particularly in the case of large or highly curved surfaces.

SUMMARY OF THE INVENTION

An object of the present invention is therefore to provide a method and to create a device which achieve a higher speed in the detection of defects on reflective surfaces.

The above object is solved by a method according to one or more embodiments described herein, a device with the features of one or more embodiments described herein, as well as a computer program product with the features of one or more embodiments described herein and a computer-readable data carrier with the features of one or more embodiments described herein.

In particular, the object may be solved by a method for detecting local defects on a reflective surface by means of a device comprising at least one pattern for reflection on the reflective surface, at least one camera and a data processing unit. The pattern comprises at least one essentially line-shaped light-dark transition, wherein the positioning and orientation of the camera are known, wherein the camera records the pattern reflected on the surface and generates image data of the reflected pattern, which are transmitted from the camera to the data processing unit. The data processing unit determines local defects on the reflective surface based on an evaluation of at least one property of the at least one light-dark transition in the image data of the reflected 2-dimensional pattern. No geometric measurement of the surface is carried out here, but only local deviations from the ideal shape or local defects are found. These may be large or small. The high inspection speed that can be achieved by the method according to the invention is advantageous, as the calculations are less complicated and therefore not as time-consuming as in the prior art.

In the context of the present invention, the reflective surface is not only a fully reflective surface, but in particular also a partially transparent surface of a solid or liquid object, for example a pane of glass. Therefore, the invention as a whole is also particularly suitable for detecting defects in the surface of windscreens for motor vehicles or other curved panes. The reflective surface reflects electromagnetic radiation of the visible wavelength range at least partially, for example over a wavelength range of 380 nm to 780 nm or a section of this range. In addition, the surface can also reflect electromagnetic radiation in the range of infrared radiation (wavelength greater than 780 nm) and/or UV radiation (wavelength less than 380 nm).

In one embodiment, the defects of several reflective surfaces can be determined, e.g. the top and bottom of a pane of glass and/or several panes of glass or other transparent objects arranged one above the other.

The camera is a digital camera, for example a matrix or line scan camera, whose position and orientation in space is known, in particular in relation to the reflective surface. The position and orientation of the camera can be determined by calibration. For example, by knowing the viewing direction for each pixel of the camera, the corresponding pattern position may be determined from the position of the pattern area reflected on this pixel with good spatial resolution and simple optical means, so that a fast and accurate local assignment of a detected defect to its position on the surface is possible. The camera determines a brightness value and/or a color value for each image of the pattern and each pixel, which shape the image data that makes up an image of the pattern. These image data are then forwarded to the data processing unit and analyzed there.

The data processing unit may be integrated into the camera as a module or may form a unit separate from the camera. In the latter case, the image data are transmitted by wire or wireless from the camera to the data processing unit. The data processing unit comprises a processor, which is a functional module that interprets and executes instructions/commands of an algorithm as well as comprises an instruction control unit, an arithmetic unit and a logic unit. The processor may comprise at least a microprocessor, a digital signal processor (DSP), an application-specific integrated circuit (ASIC), a field programmable gate array (FPGA-digital integrated circuit into which a logic circuit can be programmed), a discrete logic circuit and any combination of these components. The data processing unit may also comprise a memory module, an input module (e.g. keyboard or touchpad), a power supply module (e.g. battery) and a display module (e.g. display). The data processing unit may be shaped as a real hardware resource, for example a smartphone, desktop computer, server, notebook, cluster/warehouse scale computer, embedded system or the like, or as a virtualized computer resource. The data processing unit may also comprise a transmitter/receiver (transceiver) for exchanging data with the camera.

The pattern may be displayed on a screen and arranged in a predetermined position above the reflective surface by means of a pattern holder. The camera views the reflected image of the pattern and records it. The camera is also positioned above the reflective surface, i.e. on the same side of the reflective surface as the pattern. The pattern is positioned so that it faces the reflective surface.

To further increase accuracy, it is possible in one embodiment for the pattern to be shown on one or more displays. In this way, the design of the pattern may be adapted to the conditions of the reflective surface (e.g. its dimensions). In one embodiment, the pattern may be designed as a black and white pattern or as a color pattern. It contains at least one essentially line-shaped light-dark transition, which forms a continuous light or dark line in the transition, depending on how it is viewed. The line may be shaped completely straight or curved or sectionwise straight and/or sectionwise curved. If the light-dark transition is viewed transversely to the line, it forms an area of high brightness (light area), which is followed by an area of low brightness (dark area) or vice versa, wherein the line is formed between the light and dark area, i.e. through the transition from light to dark or dark to light. In one embodiment, this transition is formed sharply, i.e. the gradient of brightness across the transition is comparatively large, for example the relative change in brightness per mm is at least 60% per mm. The brightness (value) is defined as the respective intensity of the light in a given wavelength range.

In one embodiment of the method, a property of the at least one light-dark transition in the image data comprises a shape of the at least one light-dark transition and/or a contrast in a predetermined area of the at least one light-dark transition and/or a change in brightness over a predetermined distance across the at least one light-dark transition, in each case in the image data. This embodiment is based on the finding that a defect on the reflective surface results in a deviation in the shape of the line of the light-dark transition and/or in the contrast of an area of the line or in the change in brightness of the light-dark transition in the image data, which is recognized when the image data is analyzed in the data processing unit. Contrast is defined here as a value that is calculated from a minimum brightness value (Imin) in the specified area of the image data and a maximum brightness value (Imax). The contrast value determined in this way is compared with a predefined contrast target value or contrast target value range, which is defined using the camera parameters, for example. If the calculated contrast value differs from the contrast target value or is outside the contrast target value range, a defect is determined. With regard to the shape of the line, a comparison of the determined line shape with a predefined line shape (so-called pattern comparison) is carried out. For this purpose, the data processing unit first recognizes the line in the image as the brightest line-shaped section (for a bright line) or the darkest line-shaped section (for a dark line), determines its shape and detects the adjacent bright and dark areas. If there is a deviation in the line-shaped section that exceeds a specified tolerance range, a defect is also detected. For example, the surface may comprise a change in direction, a change in inclination or a change in curvature, which is detected by a deviation in the line shape in relation to the pattern. With regard to the brightness change (i.e. gradient of brightness) over a specified distance of the cut-off transition, it is also determined whether the measured brightness change deviates from a brightness change target value or a brightness change target value range. If this is the case, a defect in the surface is detected. For example, the light-dark transition in the image in the area of a defect may appear less "sharp" and more "washed out" than in the original pattern, which can be represented by the brightness gradient. The gradient in the camera image is therefore smaller than in the original pattern.

Since the position and viewing direction of the camera are known and therefore information is also available about which area of the image data captures which local area of the reflective surface, the determined defect can be assigned to a position of the surface when a defect is detected, for example using one or more of the above analyses. The dimensions of the defect may also be determined by using the data processing unit to determine the area of the surface over which the deviations from the target values or target value areas or the line-shaped area extend.

In one embodiment, the position of the pattern in relation to the surface is unknown, i.e. not fixed. This means that the pattern is not calibrated in relation to the camera and the reflective surface. The exact position of the pattern is not required for the task at hand, as no measurement of the reflective surface is required, only a determination of the position and/or dimension of a defect on the surface. A defect is understood to be a deviation from the desired surface quality and/or structure that impairs the optical properties of the surface, in particular the properties of the reflection of electromagnetic radiation in the visible wavelength range. The defects may include, for example, inclusions in the surface area, unevenness in the surface and the like. In order to correctly evaluate the property of the cut-off transition, the camera is focused on an average distance of the reflective surface. Furthermore, an aperture setting of the camera is selected such that the line of the at least one light-dark transition is imaged in such a way that the light-dark transition can be detected.

In one embodiment, the pattern comprises at least one stripe that forms two light-dark transitions and the data processing unit evaluates the width of the at least one stripe to determine local defects on the surface. The at least one stripe may be shaped as a bright stripe (light stripe) in relation to a dark environment or a dark stripe in relation to a bright environment in the pattern. In a further embodiment, the pattern may be shaped as a grid of stripes. The at least one stripe is only used to create two light-dark transitions, but does not represent an encoding in relation to the pattern.

In one embodiment, the pattern and/or the surface move relative to each other while the reflected pattern is being recorded by the camera. In this way, a large reflective surface-compared to the size of the pattern—may be measured.

The object may also be solved by a device for detecting local defects on a reflective surface, which comprises at least one pattern for reflection on the reflective surface, at least one camera and a data processing unit, wherein the pattern comprises at least one essentially line-shaped light-dark transition, wherein the positioning and orientation of the camera are known, wherein the camera is configured to record the pattern reflected on the surface and to generate image data of the reflected pattern and to transmit them to the data processing unit, wherein the data processing unit is configured to determine local defects on the surface based on an evaluation of at least one property of the at least one light-dark transition in the image data of the reflected pattern. The device enables defects on a reflective surface to be localized quickly and with little effort.

The embodiments given above for the pattern are also relevant for the above device. Reference is made to the explanations above.

In one embodiment of the device, the pattern comprises at least one stripe forming two substantially line-shaped light-dark transitions, and the data processing unit is configured to evaluate the width of the at least one stripe to determine local defects on the surface. As already explained above, the use of bright stripes (light stripes) or dark stripes and the evaluation of the stripe width in the image data for localizing defects involves a very simple embodiment of the present invention.

In one embodiment of the device, the pattern and/or surface are configured to move relative to each other while the reflected pattern is recorded by the camera in order to analyze a large surface area.

The above method may, for example be realized as a computer program comprising instructions which, when executed, cause a processor of the data processing unit to perform the steps of the above method, wherein the computer program includes a combination of the steps and data definitions described above which enable the computer hardware to perform computing or control functions, and/or which is a syntactic unit which conforms to the rules of a particular programming language and which consists of declarations and instructions or instructions required for the functions, objects or problem solutions explained above.

Further disclosed is a computer program product comprising instructions which, when executed by the processor of the data processing unit, cause the device to perform the steps of the method defined above. Accordingly, a computer-readable data carrier storing such a computer program product is disclosed. The computer program product may be a software routine.

BRIEF DESCRIPTION OF THE DRAWINGS

Further advantages, features and possible applications of the present invention are also apparent from the following description of examples of embodiments and the drawing. All the features described and/or illustrated form the subject matter of the invention either individually or in any combination, even independently of their summary in the claims or their references.

It shows schematically

FIG. 1 an embodiment of a device according to the invention for determining the shape of a reflective surface.

DETAILED DESCRIPTION OF THE PREFERRED EMBODIMENTS

FIG. 1 shows the basic structure of a device 10 for detecting defects in a reflective surface 13 of an object 3 to be inspected. The device 10 comprises a camera 1 which observes the pattern 12 of a pattern carrier 2 via the reflective surface 13. In order to be able to determine defects in the reflective surface 13 of the object 3, a coordinate system of the camera 1 is determined using a known camera calibration method. For example, a camera calibration method which observes a planar pattern in at least two different orientations and which is described in Zhang, Z., "A flexible new technique for camera calibration", IEEE Transactions on Pattern Analysis and Machine Intelligence, vol. 22, no. 11, 2000, pages 1330-1334, may be used. Further camera calibration methods are described, for example, in Fraser, Clive S., "Digital camera self-calibration", ISPRS Journal of Photogrammetry and Remote Sensing, No. 52(4), 1997, pages 149-159.

The digital camera 1 is configured to view the 2-dimensional pattern 12 reflected on the reflective surface 13 pixel-by-pixel.

The pattern 12 may have different characteristics. For this purpose, a flat screen, e.g. a TFT screen, is provided as pattern carrier 2, on which any pattern 12 can be displayed. Due to the known pixel dimensions of the flat screen 2, the geometry of the displayed pattern 12 is also precisely known. However, other realizations for a pattern carrier 2, e.g. exchangeable plates with a measured pattern in a holder, are also conceivable. For example, the pattern 12 may form two bright stripes with a width B1 and a width B2 on a dark background, having a distance which is greater than the width B1, B2 of the two stripes. Here, B1 and B2 may be the same or different. The distance between the two stripes is the distance between two neighboring light-dark transitions of the neighboring stripes. Each stripe comprises two light-dark transitions, namely a first light-dark transition from an area of low brightness to an area of high brightness and a second light-dark transition from an area of high brightness to an area of low brightness.

In practice, the objects to be examined for surface defects are, for example, a windshield of a motor vehicle. The reflective surface is the outer surface 13 of the windshield 3.

The camera 1 records an image of the stripe pattern and transmits the generated digital data to the data processing unit 7.

The detection of defects on the surface 13 is carried out by a processor contained in the data processing unit 7 based on the data transmitted by the camera 1 with the image of the light-dark transitions of the pattern reflected on the surface 13. For this purpose, the brightness and/or a color value or greyscale value received by the data processing unit 7 from the camera 1 is evaluated for each pixel of the camera that corresponds to a point of the image. For this purpose, the lines of the transitions are first searched for, which is done using threshold value operations. If the line is the brightest area of a transition, it is assumed that only the areas where the line is visible appear bright in the image. Accordingly, such a threshold value operation is of course also possible for a dark line. The line and its surroundings are extracted from the intensity maxima found; these surroundings are a curved stripe with a certain expansion of bright/dark areas perpendicular to the line, which follows the course of the reflected line. The subsequent calculations, such as determining the local contrast and determining the local shape of the line and its width, are then carried out on this strip. It is then determined whether the course of the lines comprises changes compared to the course of the pattern 12, for example changes in direction. Alternatively or additionally, the width of the stripes extending in the areas of high brightness between adjacent line-shaped light-dark transitions may be determined. If there are deviations from the pattern 12 in the light-dark transitions, the data processing unit detects a defect in the surface 13 of the windshield 3. The data processing unit 7 can also assign the defect to a specific position on the surface 13 of the windshield 3, as the camera 1 is calibrated with regard to position and viewing direction. The expansion/dimension of the defect may also be determined based on the size of the area in the image captured by the camera 1, in which a change in the respective light-dark transition is determined and linked to the corresponding positions of the area on the surface 13.

The above steps are easy to implement and result in a high inspection speed. Defect positions and dimensions are determined. The data processing unit may store the determined defects and their dimensions in a memory unit and/or show them on a display.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

1 Camera
2 Pattern carrier, flat screen
3 Windshield
7 Data processing unit
10 Device
12 Pattern
13 Reflective surface of the windshield 3

The invention claimed is:

1. A method for detecting local defects on a reflective surface with a device comprising at least one pattern for reflection on the reflective surface, at least one camera and a data processing unit, wherein the at least one pattern comprises at least one line-shaped light-dark transition, and wherein a position and orientation of the at least one camera being known, wherein the method comprises:
recording, by the at least one camera, a reflected pattern on the reflective surface and generating image data of the reflected pattern;
transmitting the image data from the at least one camera to the data processing unit; and,
determining, by the at least one data processing unit, one or more local defects on the reflective surface based on an evaluation of at least one property of the at least one line-shaped light-dark transition in the image data of the reflected pattern,
wherein the at least one property of the at least one line-shaped light-dark transition in the image data comprises a contrast in a predetermined area of the at least one line-shaped light-dark transition in the image data.

2. The method according to claim 1, wherein the at least one property of the at least one line-shaped light-dark transition in the image data further comprises a property selected from a group consisting of: a shape of the at least one line-shaped light-dark transition in the image data; a change in brightness over a predetermined distance across the at least one line-shaped light-dark transition in the image data; and combinations thereof.

3. The method according to claim 1, wherein a position of the at least one pattern with respect to the reflective surface is unknown.

4. The method according to claim 1, wherein the at least one pattern comprises at least one stripe forming two light-dark transitions, and
wherein the data processing unit evaluates a width of the at least one stripe to determine the local defects on the reflective surface.

5. The method according to claim 1, wherein the at least one pattern, or the reflective surface, or both perform a relative movement with respect to each other during the recording of the reflected pattern by the at last one camera.

6. A non-transitory computer readable medium storing a computer program product comprising instructions which, when executed by a processor, cause the processor to perform the method of claim 1.

7. A device for detecting local defects on a reflective surface comprising:
at least one pattern for reflection on the reflective surface,
at least one camera, and
a data processing unit,
wherein the at least one pattern comprises at least one line-shaped light-dark transition,
wherein a positioning and an orientation of the at least one camera are known,
wherein the camera is configured to record a reflected pattern on the reflective surface, generate image data of the reflected pattern, and transmit the image data to the data processing unit, and,
wherein the data processing unit is configured to determine local defects on the reflective surface based on an evaluation of at least one property of the at least one line-shaped light-dark transition in the image data of the reflected pattern,
wherein the at least one property of the at least one line-shaped light-dark transition in the image data comprises a contrast in a predetermined area of the at least one line-shaped light-dark transition in the image data.

8. The device according to claim 7, wherein the at least one property of the at least one line-shaped light-dark transition in the image data further comprises a property selected from a group consisting of: a shape of the at least one line-shaped light-dark transition in the image data; a change in brightness over a predetermined distance across the at least one line-shaped light-dark transition in the image data; and combinations thereof.

9. The device according to claim 7, wherein a position of the at least one pattern with respect to the reflective surface is unknown.

10. The device according to claim 7, wherein the at least one pattern comprises at least one stripe forming two line-shaped light-dark transitions, and
wherein the data processing unit is configured to evaluate a width of the at least one stripe to determine local defects on the surface.

11. The device according to claim 7, wherein the at least one pattern, or the reflective surface, or both are configured to perform a relative movement with respect to each other during the recording of the reflected pattern by the at least one camera.

* * * * *